United States Patent
Prasad et al.

(10) Patent No.: US 9,830,373 B2
(45) Date of Patent: Nov. 28, 2017

(54) DATA TRANSFER REQUESTS WITH DATA TRANSFER POLICIES

(71) Applicant: Hewlett-Packard Development Company, L.P., Fort Collins, CO (US)

(72) Inventors: Shreya Prasad, Cambridge, MA (US); Indrajit Roy, Palo Alto, CA (US); Vincent Xu, Cambridge, MA (US); Sunil Venkayala, Cambridge, MA (US); Dan Huang, Cambridge, MA (US); Kyungyong Lee, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 269 days.

(21) Appl. No.: 14/590,570

(22) Filed: Jan. 6, 2015

(65) Prior Publication Data

US 2016/0197988 A1 Jul. 7, 2016

(51) Int. Cl.
*G06F 17/30* (2006.01)
*H04L 29/08* (2006.01)

(52) U.S. Cl.
CPC .. *G06F 17/30584* (2013.01); *G06F 17/30569* (2013.01); *H04L 67/1014* (2013.01); *H04L 67/1097* (2013.01); *Y10S 707/964* (2013.01)

(58) Field of Classification Search
CPC ............... G06F 17/30584; G06F 17/30; G06F 17/30569; H04L 29/08; H04L 67/1014; H04L 67/1097; Y10S 707/964
USPC .................................................. 707/E17.032
See application file for complete search history.

(56) References Cited

U.S. PATENT DOCUMENTS

| | | | |
|---|---|---|---|
| 5,897,622 A * | 4/1999 | Blinn | G06Q 30/06 705/26.81 |
| 6,742,041 B1 * | 5/2004 | Bhagwat | H04L 47/10 709/230 |
| 7,293,024 B2 | 11/2007 | Bayliss et al. | |
| 9,619,488 B2 * | 4/2017 | Ambardekar | G06K 9/00671 |
| 2001/0011247 A1 * | 8/2001 | O'Flaherty | G06Q 20/10 705/39 |
| 2004/0193810 A1 * | 9/2004 | Borkenhagen | G06F 12/0817 711/146 |

(Continued)

OTHER PUBLICATIONS

Teradata Labs, Teradata Connector for Hadoop Tutorial, Version: 1.0, Apr. 2013 (62 pages).

(Continued)

*Primary Examiner* — Kevin Bates
*Assistant Examiner* — Chen-Liang Huang

(57) ABSTRACT

A method, system, and computer-readable storage device for transferring data from a database management system to a data analytics system is described herein. In one aspect, a database management node storing a data partition of a database table that is distributed across a plurality of database management nodes of a database management system receives a data transfer request from a data analytics node of a data analytics node cluster. The data transfer request may include a data transfer policy for splitting the data partition onto the data analytics node cluster. A data split may be identified from the data partition. The data split may be a subset of the data partition. The data split is communicated to the data analytics node according to the data transfer policy.

19 Claims, 7 Drawing Sheets

(56) References Cited

U.S. PATENT DOCUMENTS

| | | | |
|---|---|---|---|
| 2005/0086359 A1* | 4/2005 | Banerjee | G06F 9/5027 |
| | | | 709/232 |
| 2007/0226177 A1* | 9/2007 | Barsness | G06F 17/30339 |
| 2008/0104013 A1* | 5/2008 | Saus | G06F 17/30448 |
| 2011/0258179 A1* | 10/2011 | Weissman | G06F 17/30389 |
| | | | 707/714 |
| 2012/0109892 A1* | 5/2012 | Novik | G06F 17/30566 |
| | | | 707/633 |
| 2012/0124100 A1 | 5/2012 | Schabenberger et al. | |
| 2012/0191642 A1* | 7/2012 | George | G06F 17/30463 |
| | | | 707/602 |
| 2013/0238548 A1* | 9/2013 | George | G06F 17/30592 |
| | | | 707/600 |
| 2013/0262425 A1 | 10/2013 | Shamlin et al. | |
| 2013/0311441 A1* | 11/2013 | Erdogan | G06F 17/30578 |
| | | | 707/713 |

OTHER PUBLICATIONS

Wikipedia, Open Database Connectivity last modified Dec. 31, 2014 (12 pages).
Otto, G. et al., Adaptive In-memory Analytics with Teradata: Extending Your Existing Data Warehouse to Enable SAS High-performance Analytics, http://support.sas.com/resources/papers/proceedings13/076-2013.pdf, Mar. 14, 2013.

* cited by examiner

# DATA TRANSFER REQUESTS WITH DATA TRANSFER POLICIES

BACKGROUND

There have been significant technology advancements to offer high performance parallel analytics on large data sets. For example, Hadoop MapReduce™ and HP Vertica Distributed R™ implementations provide frameworks for processing data sets using distributed, multi-node clusters. In such implementations, these distributed frameworks operate on in-memory representations of the data sets. For example, a computer system executing a HP Vertica Distributed R™ framework may operate on data types such as distributed arrays, distributed frames, and the like.

BRIEF DESCRIPTION OF DRAWINGS

Examples are described in detail in the following description with reference to implementations shown in the following figures.

DETAILED DESCRIPTION

Figure 1:
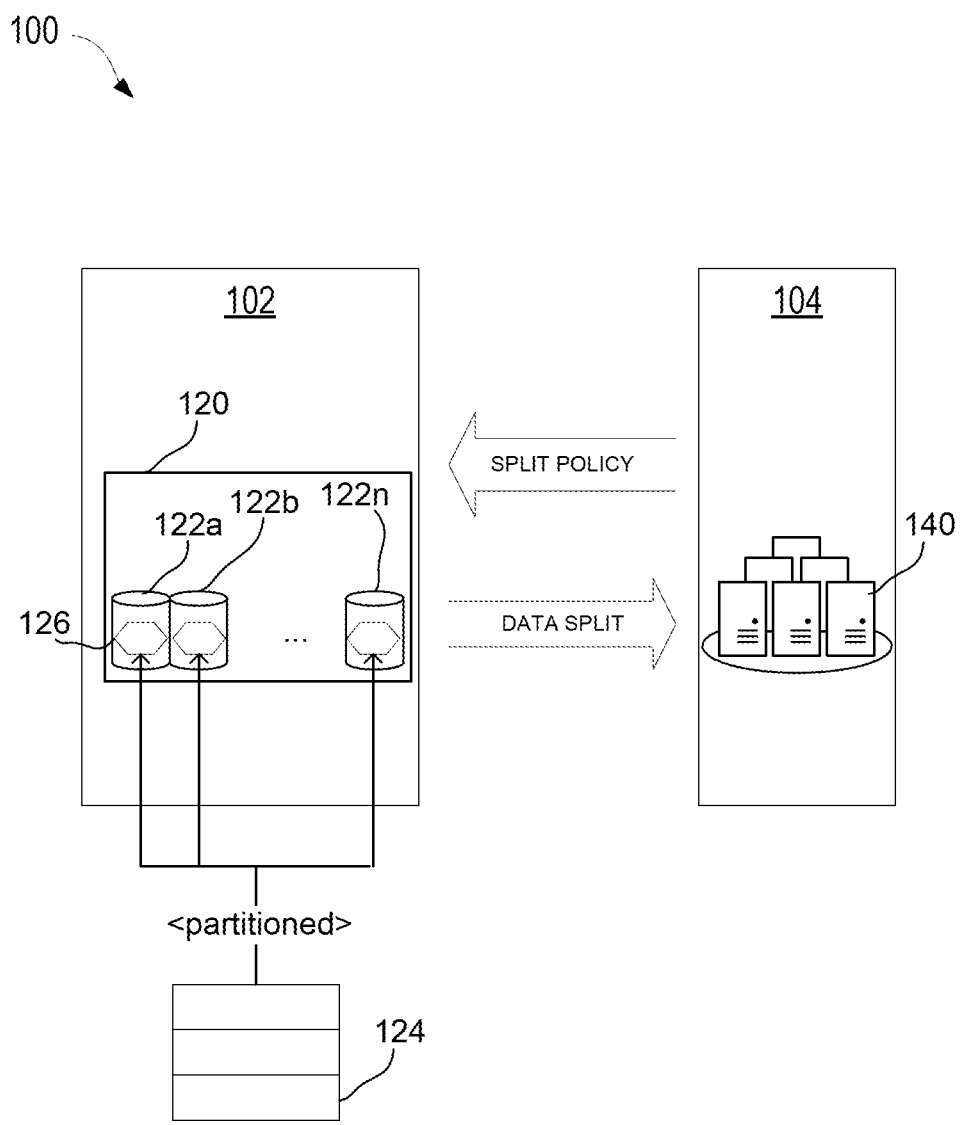
FIG. 1 is a block diagram illustrating a data processing environment for transmitting data from a database management system to a data analytics system, in accordance to an example.

This disclosure discusses, among other things, methods, systems, and computer-readable storage devices that may transfer data stored in a database management system to a data analytics system for data processing (e.g., machine learning and graph processing).

In some cases, a data analytics system may receive data for processing from a database management system. This scenario may occur when database management system houses or otherwise stores data sets that are used as inputs to the data analytics system. One way a data analytics systems can extract data from a database management system is to use open database connectivity (ODBC) connections. For example, the data analytics system can connect with a database management system and use a structured query language (SQL) query to load a database table into the data analytics system's memory as data frame. In some cases, the database management system can offer query mechanisms which allow clients (e.g., data analytics systems) to run multiple instances of functions, in parallel, to achieve parallel loading, where each instance extracts a unique data slice of data from the database table.

Simply using queries to load data, however, can come with a set of limitations. For example, queries may require a table column such as rowid or a unique data column which can be used with a SELECT clause to extract unique slices of data. Further, if a database table does not contain unique data columns, data loading can be skewed, hurting performance of operations in data analytics system. Still further, where multiple instances of a data analytics system (e.g., multiple nodes) try to connect to the distributed database system at the same time, it is possible in some cases that the database management system can get overwhelmed depending on the duster size of data analytics system.

Examples discussed herein may overcome some of these issues. For example, a data analytics node of a data analytics system may send a data transfer request that includes a data transfer policy. A data transfer policy may be data or logic that indicates how the database management system is to split the data partition across the data analytics nodes of the data analytics system. One example of a data transfer policy may balance the amount of data across data analytics nodes of the data analytics system. Another example of a data transfer policy can specify that the data distribution is maintained between the database table stored in the database management system, and, hence, preserving data locality when the database table is transferred to the data analytics system. In some cases, the format of data loaded is compatible with the data analytics system. That is, in some cases, data can be loaded independent of the user table contents/data in the database management system.

To illustrate, in one aspect, a database management node may receive a data transfer request from a data analytics node of a data analytics node cluster. The database management node may store a data partition of a database table that is distributed across other database management nodes of a database management system. The data transfer request may include a data transfer policy for splitting the data partition onto the data analytics node cluster. A data split may be identified from the data partition. The data split may be destined for the data analytics node. The database management node may then communicate the data split to the data analytics node according to the data transfer policy.

In another aspect, a device may comprise a processor and a computer-readable storage device that includes instructions that, when executed, cause the processor to select a data transfer policy that specifies a policy for splitting data partitioned across a plurality of database management nodes of a database management system. The instructions may further cause the processor to communicate a data transfer request to one of the database management nodes of the plurality of database management nodes. The data transfer request may include a parameter representing the data transfer policy.

In yet another aspect, a computer-readable storage device may include instructions that, when executed, cause the processor to perform various operations. For example, the instructions may cause the processor, when executed, to receive a data transfer request from data analytics nodes of a data analytics node cluster. The data transfer request may include a data transfer policy for splitting a data partition onto the data analytics nodes. The instructions may also cause the processor to identify data splits from the data partition. The data splits may be subsets of the data partition. The instructions may also cause the processor to communicate, according to the data transfer policy and in parallel, a first set of the data splits to the data analytics node and a second set of the data splits to the data analytics node, for example.

These and other examples are now described in greater detail.

FIG. 1 is a block diagram illustrating a data processing environment 100 for transmitting data from a database management system 102 to a data analytics system 104, in accordance to an example.

The database management system 102 may be a computer system configured to manage, store, and retrieve data. In an example, the database management system 102 may be a distributed system that includes a database node cluster 120 that stores data for, as one example, an enterprise. In one case, the data stored by the database node cluster may be a database table 124 that is distributed or otherwise partitioned among the database nodes of the database node cluster 120. One example of a partitioning scheme usable to partition the database table 124 is a hash partitioning scheme. Using a partitioning scheme, each of the database nodes 122a-n may store a data partition that represents a subset of the data of the database table 124. For example, the database node 122a may store the data partition 126.

The data analytics system 104 may be a computer system configured to process data, which may be received from the database management system 102. The processing performed by the data analytics system 104 may be distributed over a data analytics node cluster 140. The data analytics node cluster 140 may be a collection of data analytics nodes configured to perform the processing by executing a distributed framework, such as Hadoop MapReduce™ or Distributed R™. In some cases, the data analytics system 104 may run on the same servers as the database management system 102 or, in other cases, on different servers. The data transfer may occur from the database cluster to an in-memory data representation of the data analytics node cluster of the data analytics system 104.

In operation, the data analytics system 104 may send a data transfer request to the database management system 102. The data transfer request may include a data transfer policy that specifies how a data partition of a database management node can be distributed across the servers of the data analytics system 104. Upon receiving the data transfer request, the database management system 102 may identify, according to the data transfer policy, a data split from the data partition. The database management system 102 may then communicate the data split to the data analytics node.

Figure 2:
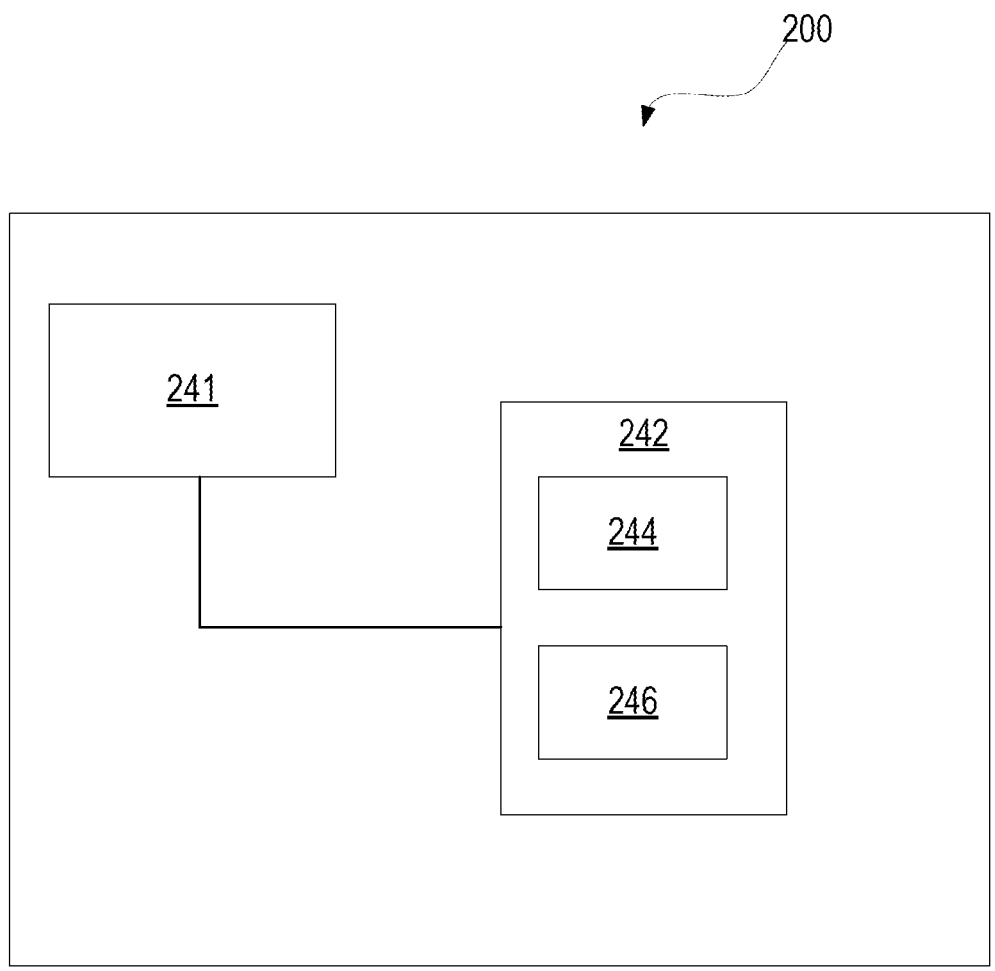
FIG. 2 is a block diagram illustrating a database management node, in accordance with an example.

Examples of database management nodes and data analytics nodes are now discussed. For example, FIG. 2 is a block diagram illustrating a database management node 200, in accordance with an example. The database management node 200 may include a processor 241 and a computer-readable storage device 242. The processor 241 may be a device suitable to read and execute processor executable instructions, such as a central processing unit (CPU), or an integrated circuit configured to perform a configured function. The processor executable instructions may cause the processor 241 to implement techniques described herein. For example the processor 241 may execute instructions for transferring identifying data splits from a data segment and communicating the data splits to a data analytics node.

The processor 241 may be coupled to the computer-readable storage device 242. The computer-readable storage device 242 may contain thereon a set of instructions, which when executed by the processor 241, cause the processor 241 to execute the techniques described herein. For example, the computer-readable storage device 242 may include the data transfer instructions 244. The computer-readable storage device 242 may also include a data partition 246 of a database table managed by the database management system 102. The data partition 246 may be data and/or logic that represents a portion or subset of the data of the database table. As discussed above, a database table managed by a database management system may be partitioned into multiple data, partitions and distributed among the database management nodes of the database management system.

With regards to the data transfer instructions 244, execution of the instructions 244, whole or in part, may cause the processor 241 to transfer data splits from the database management node 200 to a data analytics node. As is described in the foregoing, the identification and transfer of the data split may occur in accordance to a data transfer policy. In some cases, the data transfer instructions may include user defined functions that can be defined and activated by outside users of the database management system.

Figure 3:
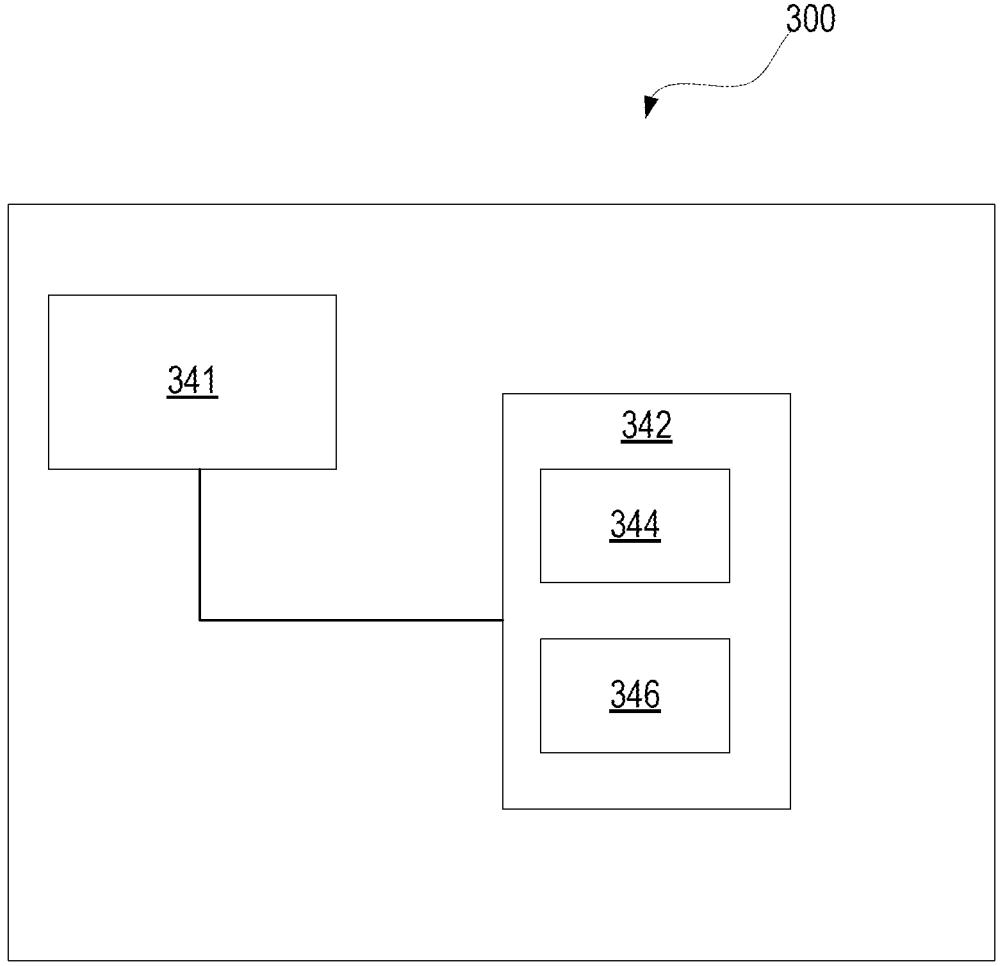
FIG. 3 is a block diagram illustrating a data analytics node, in accordance with an example.

FIG. 3 is a block diagram illustrating a data analytics node 300, in accordance with an example. The data analytics node 300 may include a processor 341 and a computer-readable storage device 342. The processor 341 may be a device suitable to read and execute processor executable instructions, such as a CPU, or an integrated circuit configured to perform a configured function. The processor executable instructions may cause the processor 341 to implement techniques described herein. For example the processor 341 may execute instructions for initiating a transfer of data splits from a database management node, receiving the data splits, and processing the data splits.

The processor 341 may be coupled to the computer-readable storage device 342. The computer-readable storage device 342 may contain thereon a set of instructions, which when executed by the processor 341, cause the processor 341 to execute the techniques described herein. For example, the computer-readable storage device 342 may include data analytics-side data transfer instructions 344. Execution of the instructions 344, whole or in part, may cause the processor 341 to initiate a transfer of data from the database management node, transform the data from the database management node into a data representation usable by the data analytics node 300, and to process the transformed data. As is described in the foregoing, the transfer of the data split may occur in accordance to a data transfer policy specified, in some cases, by the data analytics node. The computer-readable storage device 342 may also include an in-memory representation 346 of a data partition that is in the form of an object type supported by the data analytics system.

Figure 4:
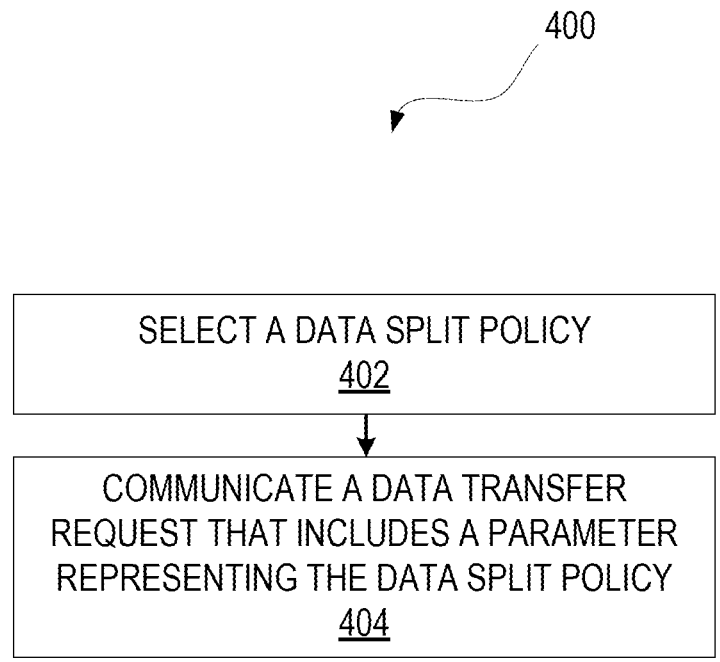
FIG. 4 is a flowchart showing a method for requesting database data from a database management node, according to an example.

Operations of the data processing environment are now discussed. FIG. 4 is a flowchart showing a method 400 for requesting database data from a database management node, according to an example. The method 400 may be performed by the modules, components, systems shown in FIG. 1, such as a data analytics node, and, accordingly, is described herein merely by way of reference thereto. It will be appreciated that the method 400 may, however, be performed on any suitable hardware. As described above, a data analytics node may be a node within a data analytics system that stores data locally on the nodes of the data analytics system, which processes the data in a distributed manner.

The method 400 may begin at operation 402 when the data analytics node selects a data transfer policy that specifies a policy for splitting a data partition of a database management node in a database management node cluster. As described above, a data transfer policy may be data or logic that indicates how the database management system is to split the data partition across the data analytics nodes of the data analytics system. By way of example and not limitation, a local split policy and a uniform split policy are examples of data transfer policies that can be supported by implementations described herein.

At operation 404, the data analytics node communicates a data transfer request to one of the database management nodes of the plurality of database management nodes. The data transfer request may include a parameter indicating the data transfer policy that is to be used in transferring the database data. To illustrate an example of a data transfer request, the data analytics management node may send the following database query to the database management system:

```
select ExportToDataAnalyticsystem(columns USING PARAMETERS
    data_transfer_policy = 'X', DA_worker_info = 'Y',
    DA_split_size=Z) over (PARTITION BEST) from t;
```

In the above data transfer request, select may be a SQL query command. ExportToDataAnalyticsystem may identify a user defined function loaded on the database management system. Columns may be a parameter to the select command which specifies the columns of the database table that the data analytics system is requesting for transfer. USING PARAMETERS specifies additional parameters for the ExportToDataAnaylticSystem user defined functions are to be listed, such as data_transfer_policy, DA_workder_info, and DA_split_size. data_transfer_policy may be a parameter to the user defined function that indicates which data transfer policy the user defined function should use to transfer the database table. The DA_workder_info may be a parameter that contains TCP socket connection information (e.g., IP-addresses and port number) of each data analytics node. In case of 'local' data transfer policy, the DA_workder_info may also contain database management-node-to-data-analytics-node mapping information to co-ordinate data transfer process. DA_split_size may be a parameter to the user defined function that approximates a 'split size' of the data splits created from the database table. The data analytics node can calculate the DA_split_size based on the number of rows in the database table and the number of instances running in the data analytics system. The number of rows can be determined in some cases using an interface provided by the database management system that allows the data analytics node to acquire metadata regarding the database table, including number of rows. PARTITION BEST may be a parameter to the select command to indicate that the database management system is to use the best partitioning. The parameter from may be a parameter that identifies the table that is to be used for transferring.

Before or after sending the data transfer request, the data analytics node may instantiate a listener thread to receive responses to the data transfer request. In some cases, the data transfer response may be transmitted using a different communication protocol than the data transfer request. For example, the data transfer request may be transmitted using a database query protocol (e.g., through an ODBD client) and the data transfer response may be transmitted using a network connection (e.g., a TCP connection).

Figure 5:
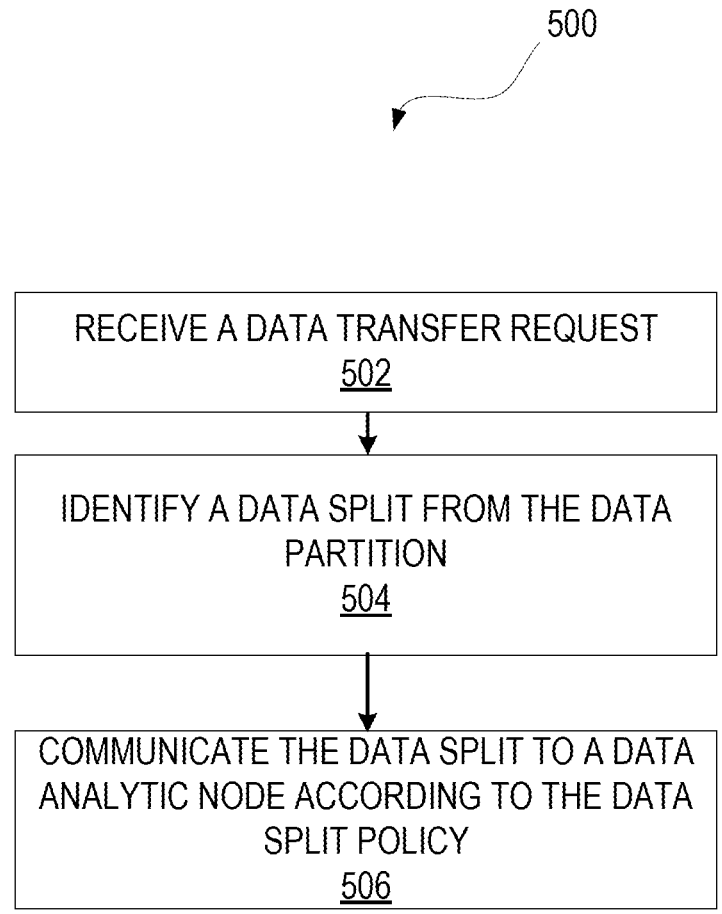
FIG. 5 is a flowchart showing a method for communicating database data to a data analytics node, according to an example.

FIG. 5 is a flowchart showing a method 500 for communicating database data to a data analytics node, according to an example. The method 500 may be perfomed by the modules, components, systems shown in FIG. 1, such as a database management node, and, accordingly, is described herein merely by way of reference thereto. It will be appreciated that the method 500 may, however, be performed on any suitable hardware. As described above, a database management node may be a node within a database management system that stores a data partition of a database table distributed across the database management nodes of the database management system.

FIG. 5 illustrates that the method 500 may begin at operation 502 when a database management node receives a data transfer request from a data analytics node of a data analytics node cluster. The data transfer request may include, among other things, a data transfer policy for splitting the data partition onto the data analytics node cluster. One example of a data transfer policy is a local split policy, which maintains the segmentation of database data used by the database management system on the data analytics system. Another example of a data transfer policy is a uniform split policy. A uniform split policy may be a data transfer policy that splits the data partitions stored by the database management nodes into multiple data splits and transfers those splits to different data analytics nodes. These data transfer policies are described in greater detail below.

At operation 504, the database management node may identify, according to the data transfer policy, a data split from the data partition for the data analytics node. For example, where the data transfer policy specifies a local split policy, the database management node may set the data split to equal the data partition utilized by the database management system. That is, under a local split policy, the partitioning of the database table used by the database management system will be maintained by the data analytics system. As another example, where the data transfer policy specifies a uniform split policy, the database management node may split the data partition into multiple data splits and send the various data splits to different data analytics nodes.

At operation 506, the database management node may communicate the data split to the data analytics node. In some cases, operation 506 may involve the database management node obtaining a network address to the data analytics node from a parameter of the data transfer request (e.g., the DA_worker_info parameter described above). Using this network address, the database management node may establish a network connection (e.g., a network socket connection) with the database management node and then transmit the data split to the database management node.

Upon receiving the data split from the database management node, the data analytics node may obtain an available thread from its thread pool and assign the thread the task of reading the data from that connection communicating the data split. The data analytics node may stage the data from the data split into a shared data buffer. The thread pool may help in parallelizing the importing/reading of data in data analytics system side. Once number of data rows in the data buffer reaches the anticipated split size, the data split is flushed into memory as a shared memory object in shared memory (/dev/shm) using operating system calls such as mmap.

After database management node has completed exporting the data, a data object usable by the data analytics system (e.g., a darray), is created by the data analytics system with as many partitions/splits received. An API offered by data analytics system (e.g., foreach( )) can be called to convert the imported data into objects using and update the value of each partition with the converted object.

As a result of the above, data is loaded from a database table to data analytics memory as a well-defined, possibly distributed, object, ready to be used by, data analytics system.

Figure 6:
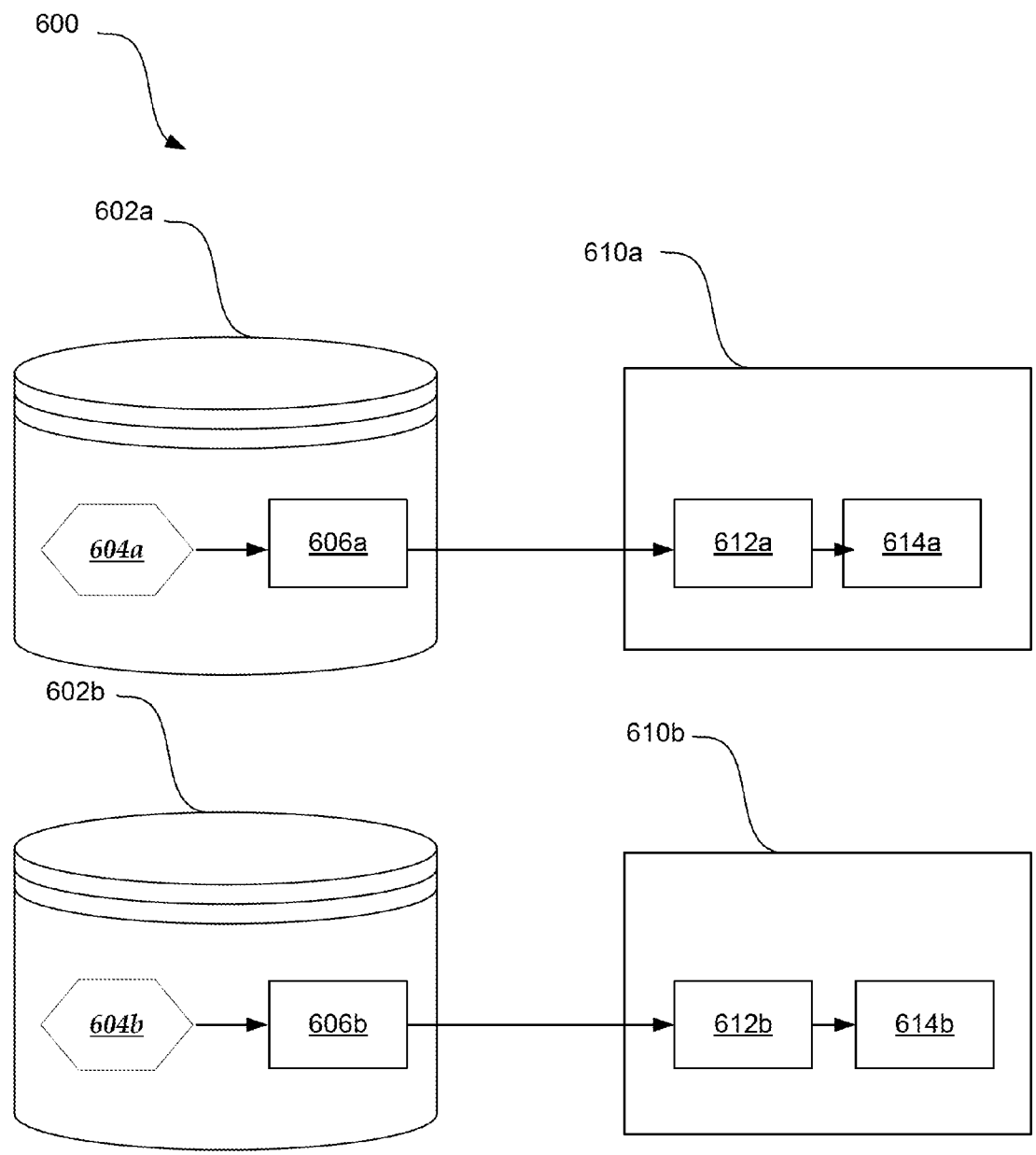
FIGS. 6 and 7 are diagrams that illustrate some features of different data transfer policies, according to examples.
Figure 7:
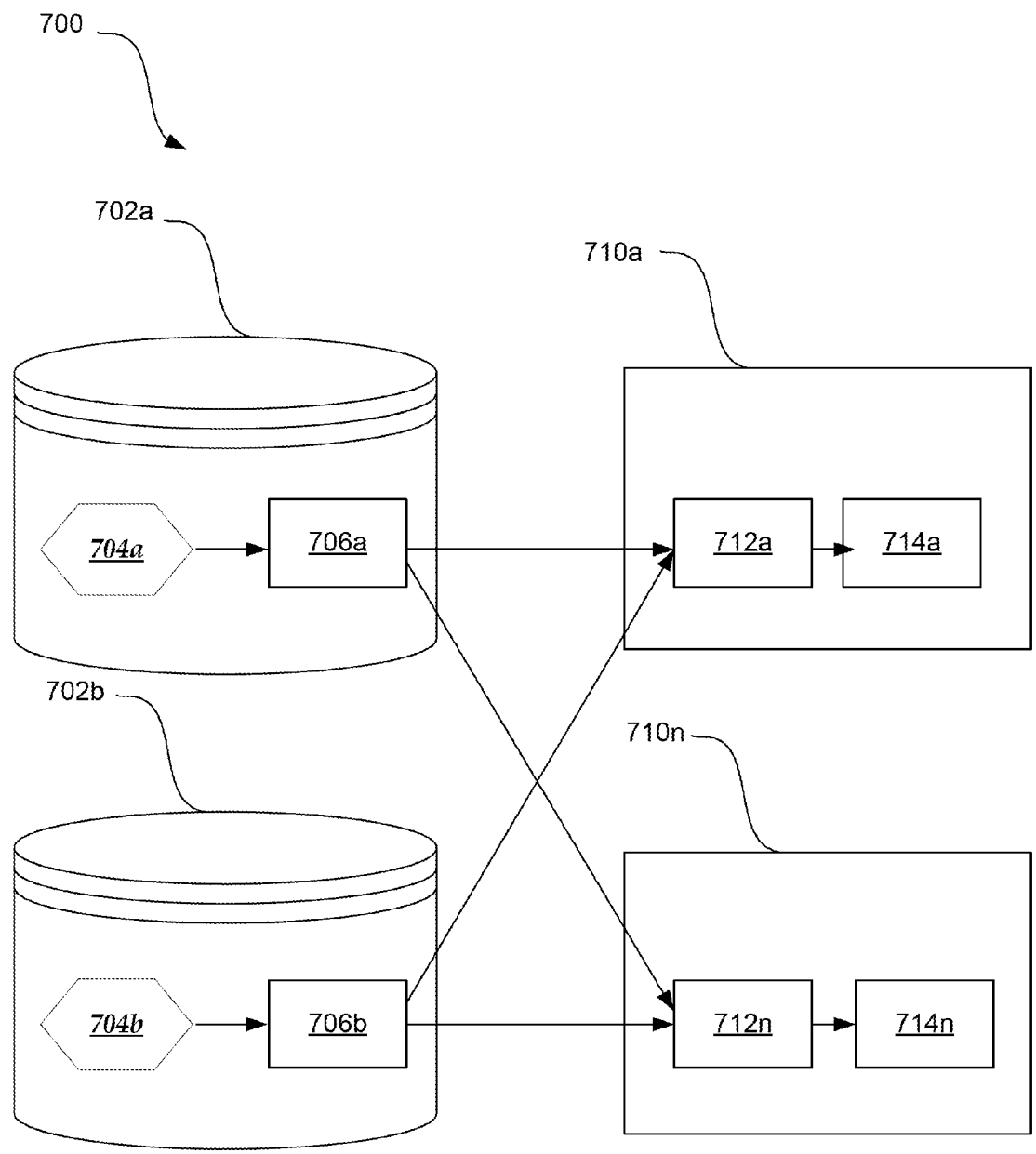

FIGS. 6 and 7 are diagrams that illustrate some features of different data transfer policies, according to examples. For example, FIG. 6 illustrates a system 600 where database management nodes 602a,b transfer data splits to data analytics nodes 610*a,b*, respectively, according to a local data transfer policy. In operation, the data analytics node 610*a* may send a data transfer request to the database management node 602*a* and the data analytics node 610*b* may send a data transfer request to the database management node 602*b*. These data transfer requests may indicate a local data transfer policy. Accordingly, a data transfer module 606*a* of the database management module 602*a* may transfer data splits from the data partition 604*a* to the data analytics transfer module 612*a*, which then converts the received data to a data object 614*a* usable by the data analytics system.

Further, a data transfer module 606*b* of the database management module 602*b* may transfer data splits from the data partition 604*b* to the data analytics transfer module 612*b*, which then converts the received data to a data object 614*b* usable by the data analytics system.

With respect to FIG. 7, this figure illustrates a system 700 where database management nodes 702*a,b* transfer data splits to data analytics nodes 710*a-n*, uniformly, according to a uniform data transfer policy. In operation, the data analytics node 710*a* may send data transfer requests to the database management nodes 702*a,b* and the data analytics node 710*n* may send a data transfer requests to the database management nodes 702*a,b*. These data transfer requests may indicate a uniform data transfer policy. Accordingly, data transfer modules 706*a,b* (e.g., user defined functions executed by processors) of the database management module 702*a* may each transfer data splits from the data partition 704*a,b*, respectively, to the data analytics transfer modules 712*a-n*, which then convert the received data to data objects 714*a-n* usable by the data analytics system.

To illustrate FIG. 7 in further detail, by way of example and not limitation, the database management node 702*a* may receive a data transfer request from the data analytics nodes 710*a-n* of a data analytics node cluster. The data transfer request may include a data transfer policy for splitting a data partition onto the data analytics nodes 710*a-n*. The database management node 702*a* may then identify data splits from the data partition. The data splits may be subsets of the data partition. The database management node 702*a* may then communicate, according to the data transfer policy and in parallel, a first set of the data splits to the data analytics node 710*a* and a second set of the data splits to the data analytics node 710*n*, for example. The selection of the data analytics nodes to send data sets to may be determined based on a round robin selection or a random selection.

What is claimed is:

1. A method comprising:

receiving, by a database management node storing a data partition of a database table that is distributed across a plurality of database management nodes of a database management system, a data transfer request from a data analytics node of a cluster of data analytics nodes, the data transfer request requesting loading of data from the database management system to the cluster of data analytics nodes and including a data transfer policy for splitting the data partition onto the data analytics nodes of the cluster, wherein the data transfer request is a database select query including a parameter specifying the data transfer policy, a parameter identifying a table, and a parameter identifying a column of the table to load to the cluster of data analytics nodes, and wherein the data transfer request further identifies a user defined function, and the parameter specifying the data transfer policy is a parameter of the user defined function;

identifying, according to the data transfer policy of the data transfer request, a data split from the data partition, the data split being a subset of the data partition and identified in response to the data transfer request to load the data split to the cluster of data analytics nodes; and communicating, by the database management node in response to the data transfer request, the data split to the data analytics node.

2. The method of claim 1, further comprising communicating additional data splits to the cluster of data analytics nodes according to the data transfer policy, the additional data splits and the data split representing the data partition.

3. The method of claim 1, further comprising, while communicating the data split to the data analytics node, communicating an additional data split derived from the data partition to an additional data analytics node according to the data transfer policy.

4. The method of claim 1, wherein the data transfer policy includes a parameter specifying a split size, and further comprising:

using the split size for splitting the partition;

splitting the data partition into a plurality of data splits including the data split and an additional data split according to the split size; and communicating the additional data split to another data analytics node of the cluster of data analytics nodes.

5. The method of claim 1, wherein communicating the data split comprises establishing a network connection with the data analytics node using a network address supplied as a parameter of the data transfer request.

6. The method of claim 1, further comprising, responsive to receiving the data transfer request, activating a user defined function identified by a parameter of the data transfer request.

7. A first client device comprising:

a processor; and a non-transitory computer-readable storage medium storing instructions that are executable on the processor to:

select a data transfer policy from a plurality of different data transfer policies, the selected data transfer policy specifying splitting of data partitioned across a plurality of database management nodes of a database management system;

communicate a data transfer request to a first database management node of the plurality of database management nodes, the data transfer request requesting loading of data from the database management system to a cluster of client devices including the first client device, wherein the data transfer request is a database select query including a parameter representing the data transfer policy, a parameter identifying a table, and a parameter identifying a column of the table to load to the cluster of data analytics nodes, and wherein the data transfer request further identifies a user defined function, and the parameter specifying the data transfer policy is a parameter of the user defined function; and receive a data split identified by the first database management node in response to the data transfer request and based on the data transfer policy represented by the parameter in the data transfer request, the data split being a subset of a data partition of the data partitioned across the plurality of database management nodes.

8. The first client device of claim 7, wherein the data transfer policy specifies transmitting subsets of a data partition managed by a database management node to a plurality of the client devices.

9. The first client device of claim 7, wherein the instructions are executable on the processor to instantiate a listener thread with a network address specified by a network address parameter of the data transfer request.

10. The first client device of claim 9, wherein the listener, responsive to receiving a response to the data transfer request, is to assign a worker thread from a thread pool to store the data split in a memory.

11. The first client device of claim 10, wherein the data transfer request is sent via a first communication protocol and the response is received via a different second communication protocol.

12. A non-transitory computer-readable storage medium storing instructions that, when executed, cause a database management node to:
receive a data transfer request from a data analytics node of a cluster of data analytics nodes, the data transfer request including a data transfer policy for splitting a data partition of data distributed across a plurality of database management nodes of a database management system onto a first data analytics node and a second data analytics node of the cluster of data analytics nodes, the data transfer request requesting loading of data from the database management system to the cluster of data analytics nodes,
wherein the data transfer request is a database select query including a parameter specifying the data transfer policy, a parameter identifying a table, and a parameter identifying a column of the table to load to the cluster of data analytics nodes, and
wherein the data transfer request further identifies a user defined function, and the parameter specifying the data transfer policy is a parameter of the user defined function;
identify, according to the data transfer policy of the data transfer request, data splits from the data partition, the data splits being subsets of the data partition identified in response to the data transfer request to load the data splits to the cluster of data analytics nodes; and
communicate, in response to the data transfer request and in parallel, a first set of the data splits to the first data analytics node and a second set of the data splits to the second data analytics node.

13. The non-transitory computer-readable storage medium of claim 12, wherein the first set of the data splits and the second set of the data splits are uniformly sized.

14. The non-transitory computer-readable storage medium of claim 12, wherein the data transfer request further includes respective network addresses for the first data analytics node and the second data analytics node.

15. The non-transitory computer-readable storage medium of claim 12, wherein the data transfer request further includes a user defined function identifier, and the instructions upon execution cause the database management node to further activate the user defined function identified by the user defined function identifier.

16. The method of claim 4, wherein the split size is computed by the data analytics node based on a number of rows of the database table and a number of data analytics nodes in the cluster of data analytics nodes.

17. The method of claim 1, wherein the data transfer request includes a parameter specifying the data transfer policy, the data transfer policy selectable from a plurality of different data transfer policies.

18. The first client device of claim 7, wherein the data transfer request further includes a parameter specifying a split size for splitting the data partition, wherein the instructions are executable on the processor to:
compute the split size based on a number of rows of the table and a number of client devices in the cluster of client devices.

19. The non-transitory computer-readable storage medium of claim 12, wherein the data transfer request further includes a parameter specifying a split size for splitting the data partition, wherein the split size is computed by the data analytics node based on a number of rows of the table and a number of client devices in the cluster of client devices.

* * * * *